May 7, 1935.  A. C. HUMMEL  2,000,287
PORTABLE DEVICE FOR DISPENSING GUMMED TAPE
Filed June 23, 1931   3 Sheets-Sheet 1

INVENTOR.
August C. Hummel
BY Allen & Allen
ATTORNEYS.

May 7, 1935.  A. C. HUMMEL  2,000,287
PORTABLE DEVICE FOR DISPENSING GUMMED TAPE
Filed June 23, 1931  3 Sheets-Sheet 2

INVENTOR.
August C. Hummel
BY Allen & Allen
ATTORNEYS.

May 7, 1935. A. C. HUMMEL 2,000,287
PORTABLE DEVICE FOR DISPENSING GUMMED TAPE
Filed June 23, 1931 3 Sheets-Sheet 3
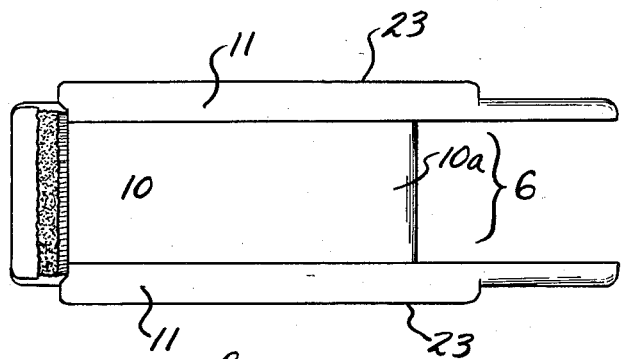
Fig.10.
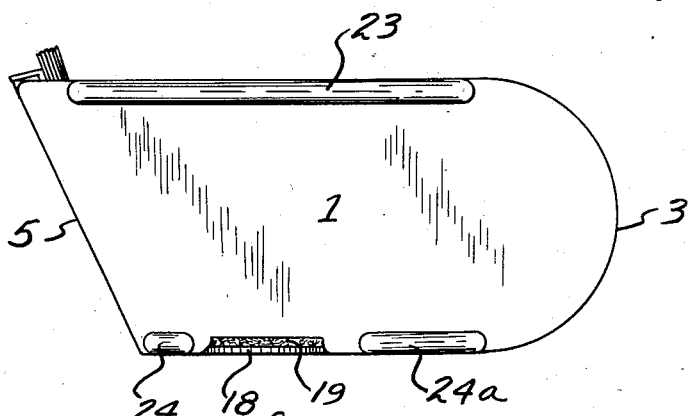
Fig.11
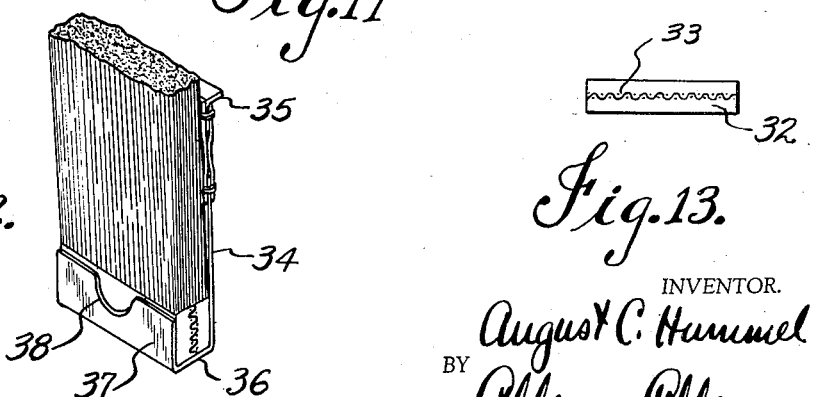
Fig.12.
Fig.13.
INVENTOR.
August C. Hummel
BY Allen & Allen
ATTORNEYS.

Patented May 7, 1935

2,000,287

UNITED STATES PATENT OFFICE 2,000,287

PORTABLE DEVICE FOR DISPENSING GUMMED TAPE

August C. Hummel, Cincinnati, Ohio

Application June 23, 1931, Serial No. 546,359

13 Claims. (Cl. 91—14.5)

My invention relates to devices for dispensing gummed tape, or roll labels, and its fundamental object is to provide a dispensing machine or device which may be held and operated in the hand. A particular advantage of a light and portable machine is that the tape may be dispensed exactly at the point of use, rendering unnecessary any conveying of moistened and sticky tape from the dispensing point to the package or the like. It is an object of my invention to provide a device having this advantage, and more particularly a device in the use of which it is not necessary to touch the tape at any time upon its moistened and gummed side.

Hence, further objects of my invention have to do with the combining in a hand device of all of the essential or desirable features of a dispensing and moistening mechanism, in an advantageous relationship of size, weight, position and structure. Additional objects have to do with the simplification and improvement of structural parts to the end of producing an extremely efficient, though economical device.

These and other objects of my invention will be amplified and explained hereinafter, and are accomplished in that structure and by that arrangement of parts of which I shall now describe an exemplary embodiment, reference being had to the accompanying drawings wherein:—

Figures 8, 9:
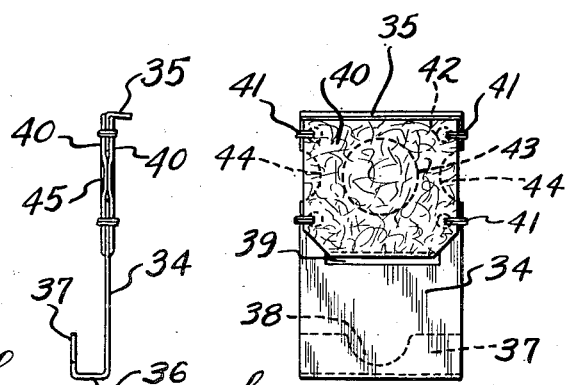
Figure 8 is an end view.

Figure 9 a side view of my moisture controlling and brush retaining member.

Figure 10 is a view of my body structure from the top thereof.

Figure 11 is an elevation of my body structure.

Figure 12 is a perspective view showing my brush held in the retaining and moisture controlling elements.

Figure 13 is a view of the end of my brush showing a reinforcing structure.

Briefly, in the practice of my invention, I provide a body of such small size and weight as is convenient for being held and operated in the hand. Preferably I make this body of molding material such as bakelite, and preferably also all in one piece. The body contains portions serving as storage means for a roll of gummed tape, a feeding space or passageway, a water reservoir with means facilitating the tight closure thereof, and a well for moistening means, whereby the water in the reservoir is applied to the gummed tape. I then provide a cover or sheath device which is adapted to fit over portions of the body, and has a number of complementary functions to the functions of the body elements, such as the completing of the closure forming the storage space for the tape, the completing of the feeding space, the coverage of the means of access to the water reservoir, the provision of a tear-off knife for severing the tape, and the provision of means whereby the tape is positioned to receive moisture from the moistening means. In this way, I achieve in a device complete in itself, a structure which, so far as the manner of its use is concerned, comprises essentially two parts, a body and a cover or sheath, the remaining elements being associated with either of the said parts. The whole device is quite small and light in weight, and in commercial practice I make them less than 5 inches in the longest dimension, slightly over 2 inches deep and about 1¾ inches wide, whereby I secure a structure easily held and carried in the hand.

I shall first describe the body member of my device. While this body could be assembled from various distinct parts, it is advantageous for considerations of economy, as well as convenience, to make it all in one piece. Thus, it may be made by die casting or the like but for appearance as well as lightness, and portability, I have achieved excellent results by making it of some one of the various synthetic resins, such as the phenolic condensation products. The body member having the parts and functions hereinafter referred to, is necessarily of somewhat complicated shape and the molding of such a shape from various substances involves different problems of coring and the like, which may be solved in slightly different ways for different molding materials. The exact shape and structure of my device may be quite widely varied without departing from the spirit of my invention, and I shall hereinafter describe a specific structure which I have made with entire satisfaction from bakelite, this structure being exemplary only and not limiting upon my invention.

Looked at in elevation, my body consists of a plain sided structure, the edges of which are substantially parallel in the longer dimension. One end is rounded and the other end terminates in an edge lying at other than a right angle to the longer edges.

Figure 5:
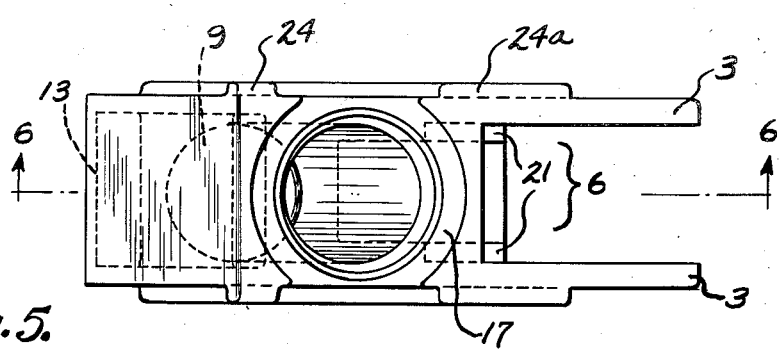
Figure 5 is a plan view of the molded body of my device from beneath.
Figure 6:
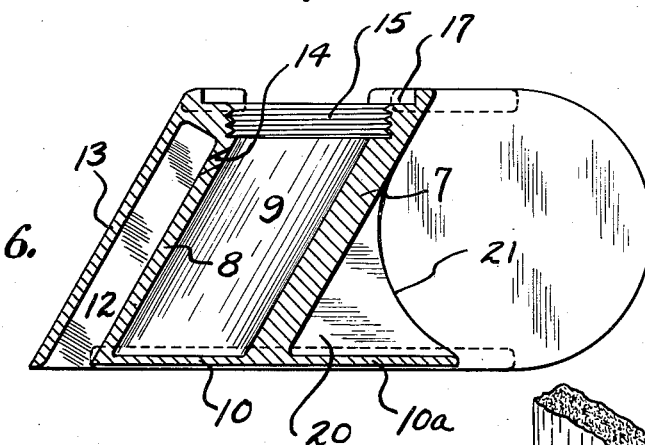
Figure 6 is a sectional view through the body taken along the lines 6—6 of Fig. 5.

I have indicated the side member proper at 1 (Fig. 11), the rounded end at 3, and the slanting or front portion at 5. As shown in Figures 5 and 10, my body portion has the side portions interspaced and between them are positioned other structures providing the moistening chamber and the water reservoir. The rounded end portions 3 project freely beyond these other members and provide a space indicated at 6, which is the storage space for a roll of gummed tape. The reservoir has a back portion 7 and a front portion or wall 8. The reservoir space proper is indicated at 9, and in the exemplary embodiment is a round hole formed by a single core. The bottom of the reservoir is what might be termed the top of my body structure. It is indicated at 10 in Figure 6, where it is shown as extending backwardly in an extension 10a. This gives a table-like structure to the top of the body member. In reality as viewed from the top, the member 10 is in the form of a wide groove flanked by raised portions 11, and it is in this groove that the paper tape from a roll contained in storage space 6, is fed to the moistening device. Beyond the reservoir, toward the front of my device, there is a moistening chamber space 12 of rectangular cross section, lying between the front wall 8 of the reservoir and the front wall 13 of my device. The moistening chamber 12 extends also at an angle as shown, permitting the desired angularity of the front edge 5 of my device. It may be explained that a slanting front edge construction is important in that it permits the dispensing point of my device to be advanced very closely to the surface of the package or other article, to which the moistened tape is to be applied. The moisture chamber 12 opens toward the top of my body member, and in a molding operation it may be formed by means of a core withdrawable therefrom in a direction opposite to the direction of withdrawal of the core which forms the reservoir 9. There is a communicating passage indicated at 14 permitting water to flow from the reservoir 9 into the moisture chamber 12; and this opening may be made if desired by a drill operating in a jig inserted into the reservoir. At the top of the reservoir I prefer to provide a screw-threaded portion 15 to receive a threaded closure cap 16. There is a flat circular shoulder 17 in my body against which a circular flange 18 on the screw cap may compress a rubber or other washer 19, in effecting a water-tight closure of the reservoir. The shoulder 17 is sunk sufficiently so that the top of the closure cap 16 does not project above the general level of the under side of my body member.

Figures 1, 2:
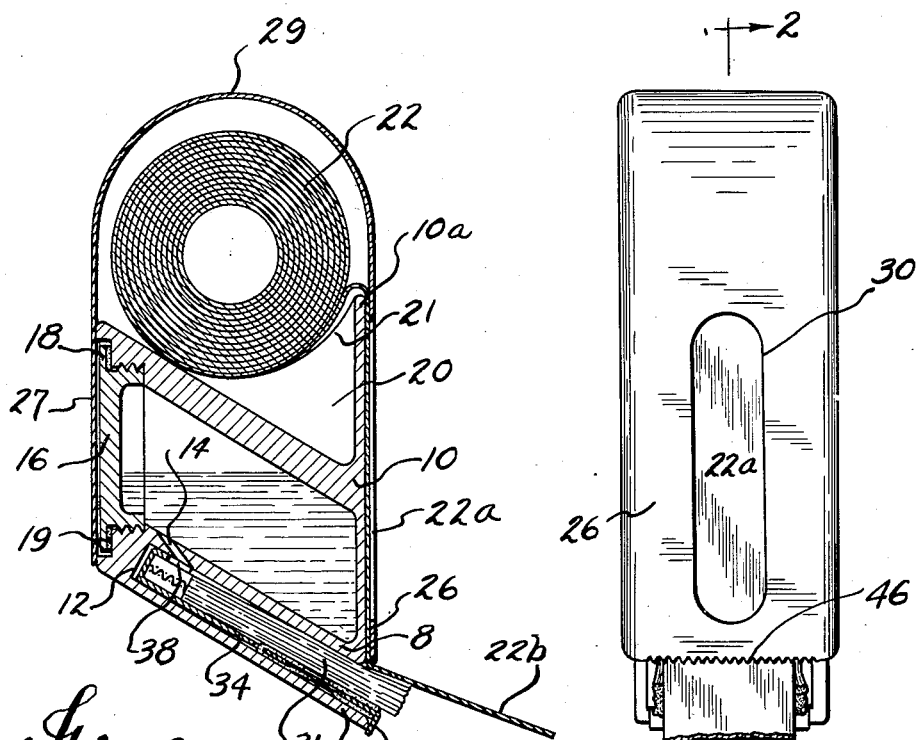
Figure 1 is a view of my completed device from the top.
Figure 2 is a sectional view therethrough taken along the lines 2—2 of Fig. 1.
Figure 3:
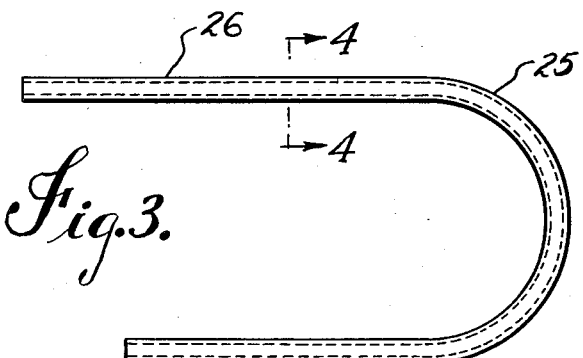
Figure 3 is an elevation of my sheath or cover device.

For the sake of economy in material, I prefer to core out a portion of the material behind my reservoir to provide a space indicated at 20, in Figures 2 and 3, but at either side of this interspace, I leave shoulders 21 of arcuate shape, against which the roll of gummed tape 22 may ride as it unrolls.

Figure 4:
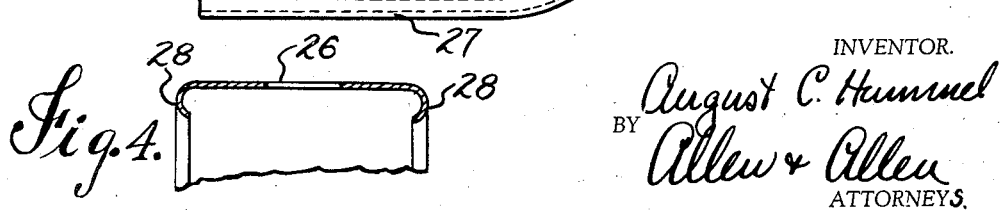
Figure 4 is a sectional view therethrough taken along the lines 4—4 of Fig. 3.

Upon the top side of my body member, the portions 11 terminate in projecting lateral ribs 23, of rounded shape, and on the bottom of my device there are somewhat similar interrupted ribs 24 and 24a. The reason for the interruption is that in the exemplary embodiment, the knurled edge of the flange 18 upon my screw cap, projects somewhat beyond the sides 1. This enables the cap to be turned easily by the fingers, and it will be seen that the edge of the flange 18 substantially lies in the line of the interrupted rib 24, 24a. The purpose of these ribs is to form means of engagement for holding the sheath or cover of my device, as will hereinafter be explained. It will be noted that the ribs are only upon the straight edges of the sides 1, and do not go around the semi-circular portions 3 of the side members. This is because my sheath or cover is withdrawn from the rounded edge of the device. The cover itself is shown in Figures 3 and 4, and is indicated generally by the numeral 25. It is of substantial U-shape, the base of the U being of semi-circular shape, corresponding to the shape of the ends of my side members 1. The legs of the U are straight and the upper one 26, is of a length sufficient to permit the outer edge thereof to approach quite closely to moistening means contained in the chamber 12. The lower leg 27 is somewhat shorter but of a length sufficient to carry the end of it substantially flush with the end of my body member. Both the legs and the base of my sheath have rolled or rounded edge portions 28, which are designed to engage over the ribs 23 and 24—24a.

In Figure 2, it will be seen that the leg 27 of my sheath covers the bottom of my body member and conceals the screw cap 16. Thus a very neat bottom construction is secured and there is no possibility of the accidental dislodgment or loosening of the cap 16 by contact with external objects. It will be seen also that the base or semi-circular portion 29 of my sheath completes the storage chamber for the roll of tape 22, and that the upper leg 26 thereof, covers the top of my device and approaches quite closely the moistening means in the chamber 12. By reason of the fact that the top wall portion 10 is recessed, there is provided in my construction a closed channel in which the end 22a of my roll of tape can pass to the moistening means. I cut an elongated slot or opening 30, in my sheath through which the end of the tape 22a can be seen when my device is in use. This opening 30 enables one to use the finger or thumb in feeding the tape initially in the feeding space, and against the moistening means.

It is preferable in my device to employ rolls 22 of gummed tape wound with the gummed side out, since (when the device is in the position shown in Figure 2, which is the position of use), this enables me to unwind my roll in a counter-clockwise direction and bring the tape back around the projecting wall portion 10a, with the gummed side of the tape next my body member, and the ungummed side disposed outwardly. When unwound in this way, there will be no tendency for my rolls 22 to bind in the storage chamber.

Figure 7:
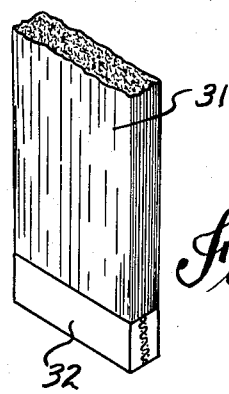
Figure 7 is a perspective view of my brush.

I provide for insertion in the moistening chamber a moistening device, an important element of which is a brush, illustrated in Fig. 7. The brush which I prefer to use is a brush having bristles 31, set in a block of molding substance such as bakelite or rubber 32, forming a base or end of the brush.

As shown in Fig. 13, I prefer to reinforce the base of my brush by the inclusion therein of a small piece of wire mesh 33, such as a piece of bronze netting.

I provide a holder for my brush, and a moisture controlling element illustrated in Figures 3 and 9, and comprising a piece of sheet metal, usually brass, because of its resistance to corrosion. It has a face portion 34 surmounted by a turned over lip 35, which will engage beyond the top of the wall 13, to prevent the combined structure from going too far down into the moisture chamber, and also is a means for removing the brush and complete structure easily and quickly from the brush chamber. At its bottom, the face member 34 has a turned over portion 36 terminating in a reversely bent portion 37. There is preferably a cut-out 38 in this portion. The bottom of the face member 34, and the portions 36 and 37 form a socket to receive the end of the brush. This is illustrated in Figs. 2 and 12, where the brush is shown as engaged in this socket. Fig. 2 indicates that the cut-out portion 38 falls in use adjacent the port 14, whereby water from the reservoir is permitted to enter the moisture chamber 12; and the reason for the cut-out is of course, to prevent the blocking up of this port.

I provide in the face member 34, a slot 39, substantially centrally and horizontally disposed. Through this slot, I insert a piece of moisture absorbing and controlling material 40, bringing it up as shown on either side of the face member 34, where it may be held by stitches 41 or the like, passing through small perforations 42, in the face member. As a moisture controlling element in my construction, I prefer to use a piece of chamois skin, but other materials such as felt, or cloth may be used, if desired. To permit direct passage of moisture from one layer of the chamois to the other, I provide my face plate with a central perforation 43 of comparatively large size. I also prefer to provide it with sidewise cut-out portions 44, so that the edges of the chamois may come together adjacent these cut-out portions, as is clearly shown in Fig. 8, at 45. The reason for this is that otherwise there is a tendency for moisture to rise by capillarity along the edges of the face member 34. Where these edges are interrupted and the chamois brought together, this cannot occur. It will be noted that although in that portion which passes through the slot 39, the chamois is somewhat narrower, yet in those portions lying along the upper part of the face member 34, the chamois is substantially as wide as the said member.

In use, my brush is placed in a socket formed by the parts 36 and 37, and the entire assembly is placed in the moisture chamber 12, the face plate 34 being disposed away from the reservoir 9. It will be seen that the bristles 31 of the brush are compressed between the upper end of the wall 8, and the face plate 34, and its coverings of chamois. The lip 35 engages over the end of the wall 13, controls the height of the brush and is also a means for taking hold to remove or replace brush structure. The compressing of the bristles controls the rate of capillary flow of water through the brush, and this is also controlled and facilitated by the absorbent coverings of chamois on the face plate 34, which themselves have an absorptive capacity and a capillary action. The brush and the retaining and controlling elements are made so as to fit the chamber space 12 snugly, and in the construction described, I not only get an adequate flow of water for moistening purposes, but I get a structure which will not leak or drip, no matter in what position the device is held. The chamber space 12, and the brush itself are preferably wider than the gummed tape 22a, so that even tho this tape is displaced somewhat sidewise, it still will be adequately moistened through its entire width.

The end of the leg 26 of my sheath is preferably given a saw tooth construction, indicated at 46, forming a tear-off knife. It may also be sharpened at this point, or instead of the saw tooth construction, it may be given a knife edge. The edge 46 approaches quite closely the bristles 31 of my moistening brush, but preferably does not actually touch them. My sheath may be slid with respect to my body member, to such a degree as affords adjustability of this feature. The adjustment should be such that if the tape is forced forward, so that an end thereof 22b, projects as is shown in Fig. 2, the tape will be forced against the bristles 31 by the sheath member 26; but if the projecting end 22b be torn off, then the end of the gummed tape lying beneath the edge 46 will not quite touch the brush. When this is done there will be, after a tearing off operation, no remaining moistened tape portion in the device.

In use, it is preferable to pick my device up in the hand, and holding it in the position shown in Fig. 2, engage the tape portion 22a, through the slot 30, by means of the thumb so as to feed it forward against the brush, until a moistened end 22b, projects. This end may then be pressed by the fingers of the other hand against a package or article to which the gummed tape is to be applied. When this has been done, and still holding the end 22b against the package by means of the fingers, if necessary, my device may be moved backwardly away from the package, drawing out of it and moistening the desired length of tape. When said length has been thus drawn out, it may be severed by a sidewise and turning motion of the device, which will cause the tape to be torn off against the knife portion 46. During the severing motion, the tape may be held against further withdrawal by the pressure of the thumb, or a finger against it, in the slot or opening 30. The severed tape may then be smoothed down against the article by means of the fingers, and it will be noted that at no time is it necessary to touch the moistened gummed side of the tape, nor in any way to soil the fingers.

When my device is not in use, as explained, there will not be in it any moistened tape portion to dry and stick against parts thereof. The device may be set down upon a desk or counter upon its bottom portion (the leg 27 of the sheath), and in this position the water in the reservoir will not tend to flow out of the device through the chamber space 12. However, in any event, my construction is such that the device will not leak even if placed upon a counter up-side-down, and water will not be discharged therefrom, excepting to the extent that it may be transferred by capillarity from the brush to some external object with which the brush may be brought into contact. The device, when rightside up upon a counter, may thus be used as a moistener for envelope flaps and the like, with the brush in upright position.

Modifications may be made in my invention without departing from the spirit thereof, and having described an exemplary embodiment of my invention, what I claim as new and desire to secure by Letters Patent is:—

1. In a hand device for dispensing gummed tape, a body member providing a reservoir chamber and a lower chamber, moistening means in said chamber, the device being used with the moistening means lowermost, said chambers being separated by a partition, a restricted passageway through said partition, said moistening means extending from said moistening chamber, a tape guide over said moistening means, and means for holding a supply of gummed tape, to extend under the guide, over and past said moistening means, said moistening means comprising a brush next to the tape guide and retaining and moistener controlling means under and against the brush.

2. In a hand device for dispensing gummed tape, a body member hollowed to form a reservoir chamber and a moistening chamber separated by a partition, said device being used with the moistening chamber lowermost, said chambers having openings respectively upon opposite sides of said body member and the moistening chamber opening laterally, closure means for said reservoir chamber, said body having on the side opposite said closure means, a relatively flat surface extending down to the opening of said moistening chamber and means to guide tape therealong to said moistening chamber, a passageway between said chambers and through said partition.

3. In a hand device for dispensing gummed tape, a body member hollowed to form a reservoir chamber and a moistening chamber separated by a partition with a passage between said chambers, said chambers having openings respectively upon opposite sides of said body member, closure means for said reservoir chamber, said body having on the side opposite said closure means, a relatively flat surface extending down to the opening of said moistening chamber and means to guide tape therealong to said moistening chamber, said body having means forming a storage space for a supply of gummed tape, and a unitary cover for said space and both sides of said body.

4. In a hand device for dispensing gummed tape, a body member hollowed to form a reservoir chamber and a moistening chamber separated by a partition, said device being used with the moistening chamber lowermost, said chambers having openings respectively upon opposite sides of said body member and the opening of the moistening chamber being laterally outward, closure means for said reservoir chamber, said body having on the side opposite said closure means, a relatively flat surface down along which tape may be fed to a point adjacent the opening of said moistening chamber, a passageway between said chambers and through said partition in combination with moistening means comprising a brush, a bracket member for holding said brush and adapted to extend within said moistening chamber at its bottom so as to maintain said brush at a given height therein, means overlapping the lower edge of the opening of said chamber to permit withdrawal of said bracket and said brush, and moisture controlling means on said bracket.

5. In a hand device for dispensing gummed tape, a body member hollowed to form a reservoir chamber and a moistening chamber separated by a partition having a passage between said chambers, said chambers having openings respectively upon opposite sides of said body member, said device being used with the moistening chamber opening lowermost and laterally outward, closure means for said reservoir chamber, said body having on the side opposite said closure means, a relatively flat surface down along which tape may be fed to a point adjacent the opening of said moistening chamber, moistening means comprising a brush, a bracket member for detachably holding said brush and adapted to extend within said moistening chamber at its bottom so as to maintain said brush at a given height therein, means overlapping the lower edge of the opening of said chamber to permit withdrawal of said bracket and said brush, and moisture controlling means on said bracket, said bracket having a clamping portion to engage around the inner end of said brush.

6. In a hand device for dispensing gummed tape, a body member hollowed to form a reservoir chamber and a moistening chamber separated by a partition having a passage between said chambers, said chambers having openings respectively upon opposite sides of said body member, closure means for said reservoir chamber, said body having on the side opposite said closure means, a relatively flat surface along which tape may be fed to a point adjacent the opening of said moistening chamber, moistening means comprising a brush, a bracket member for holding said brush and adapted to extend within said moistening chamber so as to maintain said brush at a given height therein, means overlapping the edge of the opening of said chamber to permit withdrawal of said bracket and said brush, and moisture controlling means on said bracket, said bracket having a clamping portion to engage around the inner end of said brush, said moistening means comprising a layer of chamois skin on each side of said bracket, said bracket having moisture passages therethrough.

7. In a hand device for dispensing gummed tape, a body member of elongated shape having hollowed portions comprising a moistening chamber and a reservoir chamber separated by a partition having a passage between said chambers, interspaced extensions upon one end of said body forming a space for the storage of gummed tape, said chambers having openings respectively upon opposite sides of said body, said reservoir chamber having a closure, the side of said body opposite said reservoir chamber shaped to form a feeding surface for gummed tape, and a cover member of substantially U shape, adapted to be placed on said body member to complete the closure of said storage space, to cover on one side of said body, said closure for said reservoir and on the other side of said body to cover said feeding surface, said cover member having a portion approaching the opening of said moistening chamber and having a cut-away portion permitting access to said tape on said feeding surface.

8. A portable tape dispensing and moistening device comprising four side walls and an end wall, having an opening near the meeting of the end wall and one side wall, tape moistening means exposed in said opening, tape guiding means on said one side wall, said body having a reservoir with an opening to said moistening means and an opening through another one of said side walls for filling the reservoir, and having at its end opposite said end wall a container for tape, and a unitary cover covering said tape container, said tape guide and said reservoir filling opening.

9. A portable tape dispensing and moistening device comprising a body with a reservoir in its middle, an outlet for moisture from said reservoir at one side near one end, and a filling opening for said reservoir in another side, and having a tape container near its other end and a tape guide on one side, leading from said container to said moisture outlet, and a unitary cover sliding onto said body from the end having the tape container, covering said tape container, said tape guide and said filling opening.

10. A portable tape dispensing and moistening device comprising a body having a moistening chamber and a reservoir, and having an opening from one end of said reservoir to one end of said chamber and an opening from the opposite end of said chamber to the exterior, means for feeding tape across said opening, a plurality of fibers in said moistening chamber, extending longitudinally thereof and projecting out through said opening, and absorbent fibrous moisture controlling means packed between said fibers and a wall of said moistening chamber adjacent to said opening.

11. In a device for dispensing gummed tape, comprising a brush made up of an assembly of parallel fibers, liquid supply means at one end of the brush, means to guide tape from one side of the other end of the brush to pass across and against said other end, and means having a surface extending along in contact with the other side of the brush, from the liquid supply means and terminating closer to said other end of said brush than is said tape guide means, said surface coacting with the adjacent brush fibers to conduct liquid along said surface toward said other end of said brush, to be applied to the tape through said end of the brush, and also acting to support said end of the brush under the pressure of the tape passing thereagainst.

12. In a device for dispensing gummed tape, comprising a brush made up of an assembly of parallel fibers, liquid supply means at one end of the brush, means to guide tape from one side of the other end of the brush to pass across and against the said other end, and means having a surface extending along in contact with the other side of the brush, from the liquid supply, said surface coacting with the adjacent brush fibers to conduct liquid along said surface toward said other end of said brush, and absorbent material held against the portion of said brush close to said other end, receiving the liquid conducted along said surface and promoting its supply to the tape through said portion of the brush.

13. A device as set forth in claim 12, in which the liquid supply means is above the brush when the device is in operation, and in which the absorbent material acts to control the flow of liquid, to prevent its outflow between times when it promotes the flow to the brush and tape under pressure of the brush fibers acted upon by the tape passing thereagainst.

AUGUST C. HUMMEL.